United States Patent [19]
Kane

[11] Patent Number: 6,070,332
[45] Date of Patent: Jun. 6, 2000

[54] WHEEL ALIGNMENT APPARATUS

[75] Inventor: John Kane, Sterling Heights, Mich.

[73] Assignee: AIM Automotive Integrated Manufacturing, Inc., Sterling Heights, Mich.

[21] Appl. No.: 08/953,398

[22] Filed: Oct. 17, 1997

Related U.S. Application Data

[60] Provisional application No. 60/028,690, Oct. 18, 1996, and provisional application No. 60/028,688, Oct. 18, 1996.

[51] Int. Cl.$^7$ .................................................. G01B 5/255
[52] U.S. Cl. .................................... 33/203.13; 33/203.12; 33/DIG. 2
[58] Field of Search ................................ 33/203.13, 203, 33/203.12, 203.14, DIG. 2; 73/146, 117, 118.1

[56] References Cited

U.S. PATENT DOCUMENTS

| | | | |
|---|---|---|---|
| 3,758,213 | 9/1973 | MacPherson et al. | 356/155 |
| 4,142,299 | 3/1979 | Alsina | 33/203.13 |
| 4,430,802 | 2/1984 | Cole | 33/203.12 |
| 4,897,926 | 2/1990 | Altnether et al. | 33/203.14 |
| 4,962,664 | 10/1990 | Hirano et al. | 73/118.1 |
| 5,088,320 | 2/1992 | Fukuda et al. | 33/203.13 |
| 5,111,585 | 5/1992 | Kawashima et al. | 33/203.12 |
| 5,207,001 | 5/1993 | Rossato | 33/203.12 |
| 5,313,710 | 5/1994 | Wakamori et al. | 33/203.13 |
| 5,355,586 | 10/1994 | Fukuda et al. | 33/203.13 |

*Primary Examiner*—Christopher W. Fulton
*Attorney, Agent, or Firm*—Young & Basile, P.C.

[57] ABSTRACT

An improved wheel alignment apparatus having a fixed support structure and a pair of cylindrical rollers communicating with the support structure, wherein the rollers support the wheels of a motor vehicle and allow rotation of the wheels while maintaining the motor vehicle in an essentially stationary position. The rollers are supported on a float plate utilizing a layer of pressurized air pumped below the float plate to allow the float plate to move along a substantially flat horizontal surface to allow the vehicle to settle into a steady rotational mode. The front of the float plates are connected through a series of linkages and a connecting rod to a linear actuator pivoting about a vertical axis. The linear actuator retracts to straighten the connecting rod which centers the float plate to a limited motion along the horizontal surface, and extends so that the connecting rod may pivot about a longitudinal axis and turn with the float plate and wheels of the vehicle. For removal of the vehicle from the cylindrical rollers, an inflatable bag engages a set of brake pads against the rollers and elevates the wheels of the vehicle to assist removal from the apparatus.

34 Claims, 9 Drawing Sheets

WHEEL ALIGNMENT APPARATUS

This application claims benefit of provisional application Ser. No. 60/028,690 filed Oct. 18, 1996, and a provision of Ser. No. 60/028,688 filed Oct. 18, 1996.

FIELD OF THE INVENTION

The present invention relates to a wheel alignment apparatus for motor vehicles.

BACKGROUND OF THE INVENTION

A wheel alignment examining apparatus for examining the mounting condition of a wheel of a vehicle, such as an automobile, is well known in the art. Various parameters are set for a wheel mounted on a vehicle, such as an automobile that include the so-called wheel inclination parameters, such as toe, camber and castor, in relation to running performance. In order for a vehicle to have an excellent running performance, it is important that such wheel inclination parameters be set and maintained at proper values. These wheel inclination parameters are checked before a vehicle is sent to the market upon its completion, and also checked after repair of a vehicle, such as replacement of the wheels.

It is often desired that the steering radii of a motor vehicle be tested and set before being sent to the marketplace. The front wheels of the motor vehicle are tested for a predetermined degree of turning with respect to the motor vehicle. Such tests are completed in a static mode where the wheels of the motor vehicles do not rotate during testing. To test the dynamic performance of the motor vehicle, the wheels of the motor vehicle must be allowed to rotate freely while on the motor vehicle in order to properly simulate the normal operating conditions of the motor vehicle. It is known to support each wheel of the motor vehicle on a pair of cylindrical rollers wherein the wheels of the motor vehicle are rotated while keeping the motor vehicle in a stationary position. The cylindrical rollers are typically driven by their own independent motors or drives.

The cylindrical rollers may be supported on a float plate which utilizes ball bearings on the bottom of the float plate to allow the float plate to move along a substantially flat horizontal surface and allow the motor vehicle to settle into a natural position for rotational movement of the motor vehicle's wheels. Thus, the cylindrical rollers which support the wheels of the motor vehicle are mounted to the float plates. It would be desirable to provide another means to allow the float plate to move along the flat horizontal surface which eliminates the use of ball bearings and the required bearing surface made of hardened material that support the ball bearings. The ball bearings and hardened bearing surface are additional components that require cleaning and lubrication. It would also be desirable to provide a float plate which rotates to allow for the testing of the motor vehicle's turning radius, while also providing for the floating feature of the float plate.

In addition, once the dynamic testing of the motor vehicle has been completed, the motor vehicles are driven off the cylindrical rollers and ramps that are provided at the test site. Since the rollers are free rolling, the rollers and float plates must somehow be locked in order that the wheels of the motor vehicle do not spin on the cylindrical rollers. Several known designs have attempted to utilize brakes by which to lock the cylindrical rollers and prevent the cylindrical rollers from rotating. Such brake designs typically wear, thus requiring constant adjustment. In addition, other brakes utilize bands which break under excessive forces.

Other designs have provided lock mechanisms to lock the cylindrical rollers. The tires of the motor vehicle sit low within the valley formed between the two cylindrical rollers, thus, when the motor vehicle is driven off the rollers, a great amount of force is applied to the braking mechanisms. Such high forces create excessive brake wear and slipping of brakes as well as the constant need for adjustment.

Therefore, it would be desirable to provide a locking mechanism which lifted the vehicles partially or completely off the rollers so as to reduce the amount of pressure applied to the braking mechanisms. It would also be desirable to provide a locking mechanism which did not require continual adjustment over the life of the brake pad. Further, it would be desirable to provide a locking mechanism that locks both the cylindrical rollers and the float plate with the same apparatus.

SUMMARY OF THE INVENTION

The present invention relates to an improved wheel alignment apparatus having a rotatable float plate for testing a motor vehicles turn radius and an improved braking system for the cylindrical rollers.

The invention further includes a means to eliminate the ball bearings and the hardened bearing surface for the float plate. In addition, the invention provides a loading mechanism that is self adjusting and which partially or completely lifts the vehicle off the rollers. The device utilizes a float plate for supporting the rotation of the wheels of the motor vehicle by means of elevating the float plate via air distribution. The float plate provides a plurality of apertures therethrough so that air is forced to the underside of the float plate forming an air gasket or air bearing. With this air bearing the float plate is allowed to move about a substantially horizontal surface to allow the motor vehicle to settle into a steady rotational mode without the use of the ball bearings and the hardened bearing surface.

To provide a greater degree of rotational freedom for the float plates the front ends of the float plates for the two front wheels of the motor vehicle each have pins which are connected to slotted or round apertures provided in a connecting rod which extends away from the float plate. The connecting rod has an additional second slide aperture in its mid portion, wherein a pin is inserted through the second slotted aperture. The pivot pin is connected to a rigid post which is connected to a support structure. The opposite end of the connecting rod is pivotally connected to a rod end of a linear actuator, wherein the linear actuator pivots about a vertical axis.

During the wheel alignment process, the linear actuator withdraws inward and away from the float plate, so as to straighten the connecting rod along the longitudinal axis of the runway or ramp. This acts to center the float plate and restrict movement of the float plate to the limited floating motion along the horizontal surface.

When the motor vehicle's turning radius is tested, the linear actuator relaxes and allows the front wheels of the motor vehicle to turn a predetermined arc. The linear actuator relaxes its piston arm or rod so that the rod may follow the turning of the float plate and wheels of the motor vehicle with the connecting rod. When the turning is completed, the linear actuator retracts, the connecting rod straightens, and each float plate is brought back into alignment with the longitudinal axis. Therefore, the wheel turning radius testing may be completed in a static or dynamic mode.

Further, the improved wheel alignment apparatus provides a structure which locks both the cylindrical rollers and the float plate as well as assisting the lifting of a motor vehicle off the cylindrical rollers of the wheel alignment apparatus. The improvement of the apparatus utilizes an air bag to engage and disengage a set of wear compensating brake pads with the cylindrical rollers of the wheel alignment apparatus. In addition, the air bag lifts a cam follower or rod end into and along a cam surface or V-shaped slot which is anchored to a support structure. This restricts and prohibits movement of the float plate with respect to the motor vehicle. In addition, the air bag provides an elevating function to the tires of the motor vehicle such that the motor vehicle is lifted to remove much of the braking pressure placed on the brakes of the apparatus.

Therefore, the improvements to a wheel alignment system provide a rotatable float plate which hovers over an air bearing or air gasket which allows for the testing of a motor vehicle turning radius as well as the testing of the wheel alignment of the motor vehicles wheels. The air bearing also allows for adjustment in the X-Y or horizontal plane to compensate for multiple track widths and wheel base dimensions to be run on the same machine. Further, the improvements provide an inflatable stop for the wheel alignment apparatus which prevents the cylindrical rollers of the wheel alignment apparatus from rotating, prohibits the float plate from moving, and assists in lifting the motor vehicle of the cylindrical rollers of the wheel alignment apparatus. Finally, the improvement provides an actuator to selectively limit the movement of the float plate.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENTS

With reference to the accompanying drawings, the present invention will now be described in detail with reference to the preferred embodiment.

Figure 1:
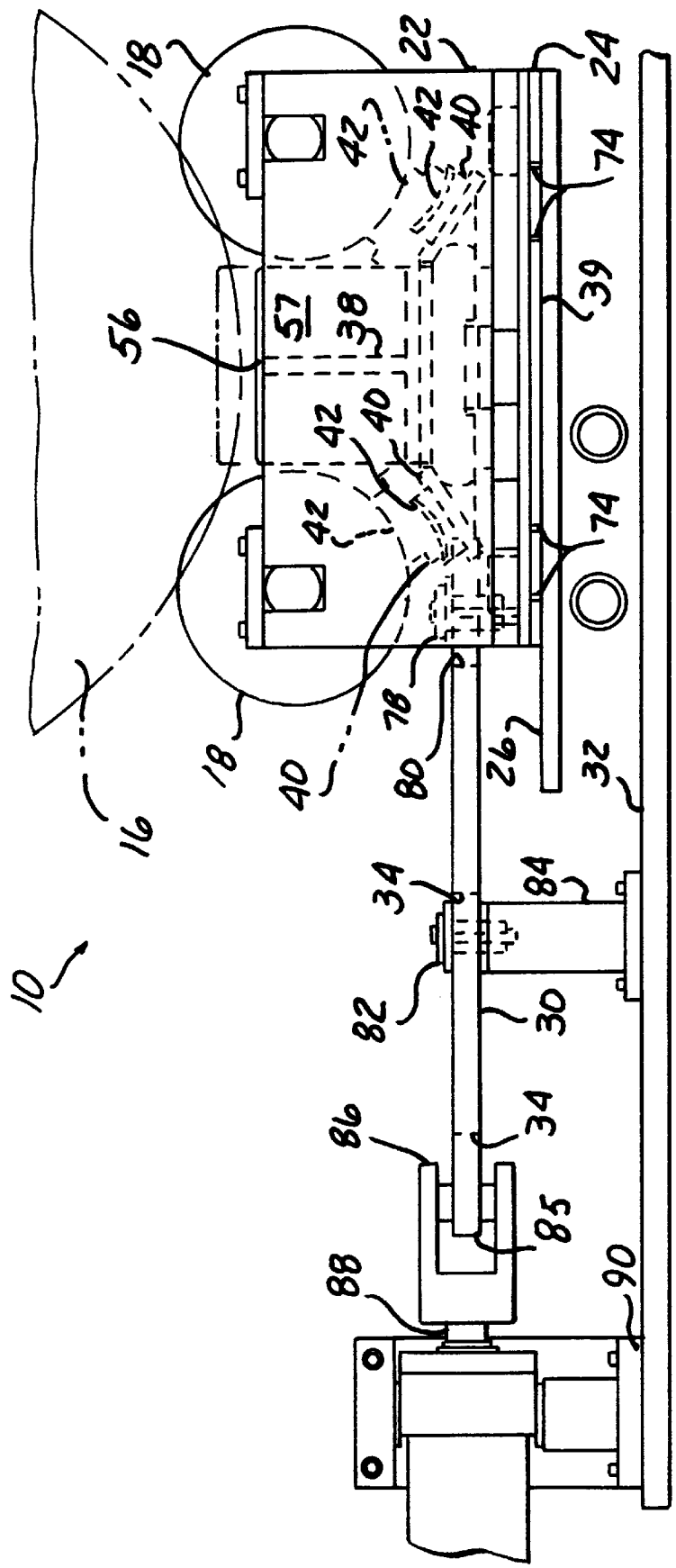
FIG. 1 is a schematic view of a wheel alignment apparatus embodying the present invention and showing an inflatable air bag in a non-inflated position and showing in phantom, the air bag in the inflated position.
Figure 2:
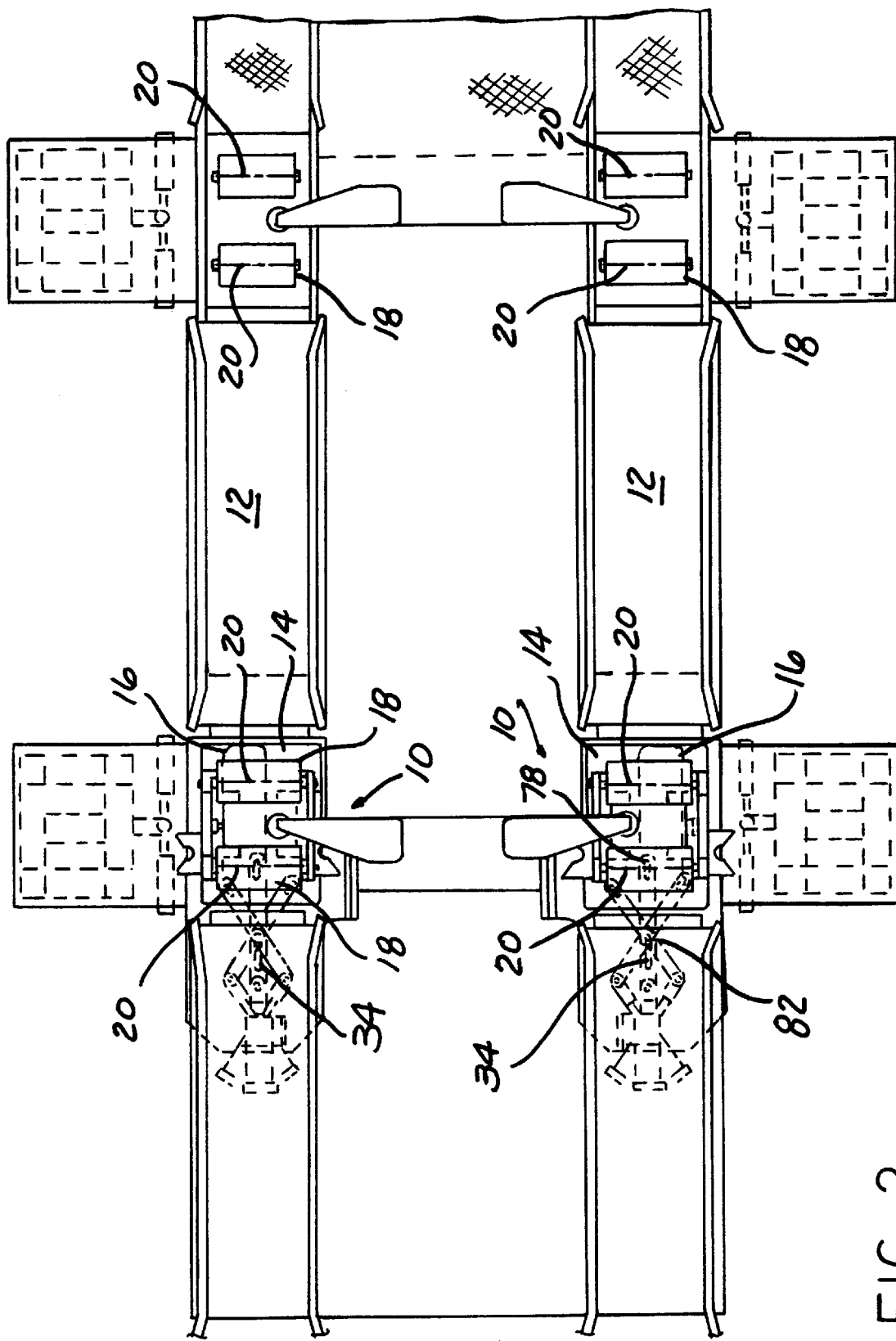
FIG. 2 is a schematic top view of the wheel alignment apparatus mounted in runways.

Looking at the illustrations in FIGS. 1 and 2, a wheel alignment apparatus 10 is shown having an inflatable stop. The wheel alignment apparatus 10 is used in conjunction with a set of ramps or runways 12. The apparatus 10 is mounted underneath the ramps 12, and providing an opening 14 in the ramp 12 to allow for the motor vehicle (not shown) to drive onto the ramp 12 and engage the apparatus 10 with its tires 16 through the openings 14 provided in the ramps 12. An apparatus may be provided for each tire 16 of the motor vehicle or for only the front tires.

Each tire of the vehicle on the apparatus 10 engages a pair of cylindrical rollers 18 of the apparatus 10. The rollers 18 have longitudinal axes 20 that are substantially parallel such that the rollers 18 are sufficiently spaced to allow for the tires 16 to be supported between the rollers 18. An independent drive or motor (not shown) is utilized to drive one of each pair of rollers 18 while the other roller is idle or free to rotate. The motorized roller 18 spins the tire 16 at a speed of 120 feet per minute during the alignment process, but the speed may vary for different testing procedures.

Figure 3:
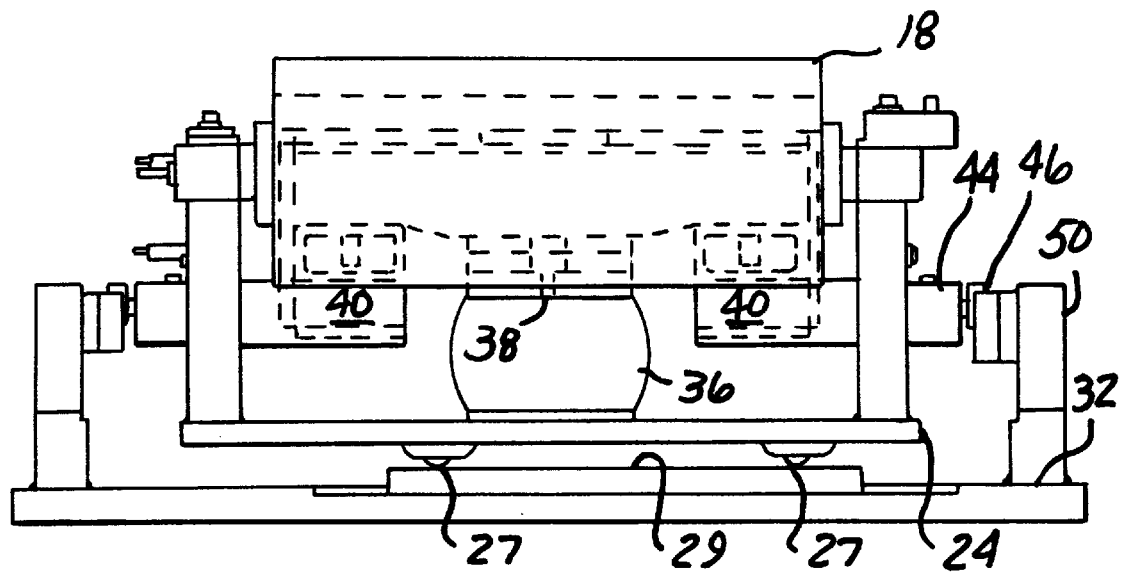
FIG. 3 is a front view of a wheel alignment apparatus with ball bearings under the float plate.
Figure 4:
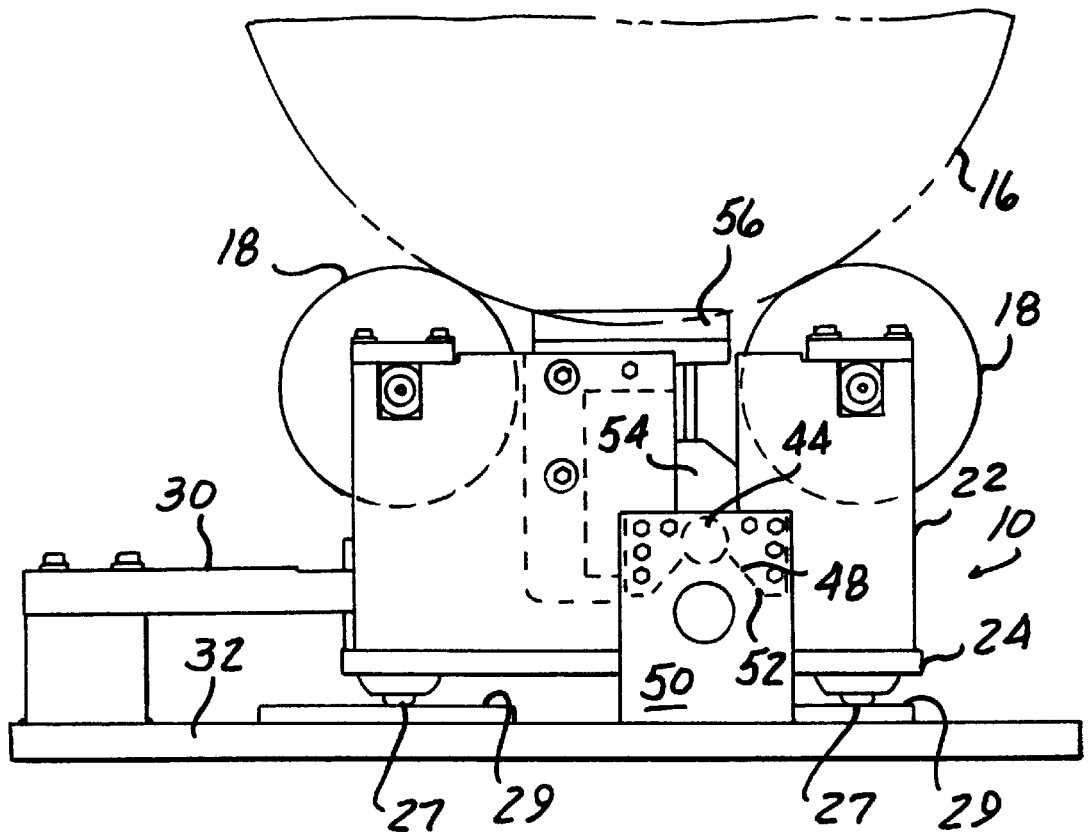
FIG. 4 is a side view of the wheel alignment apparatus in FIG. 3 showing a non-movable stop for the float plate.
Figure 5:
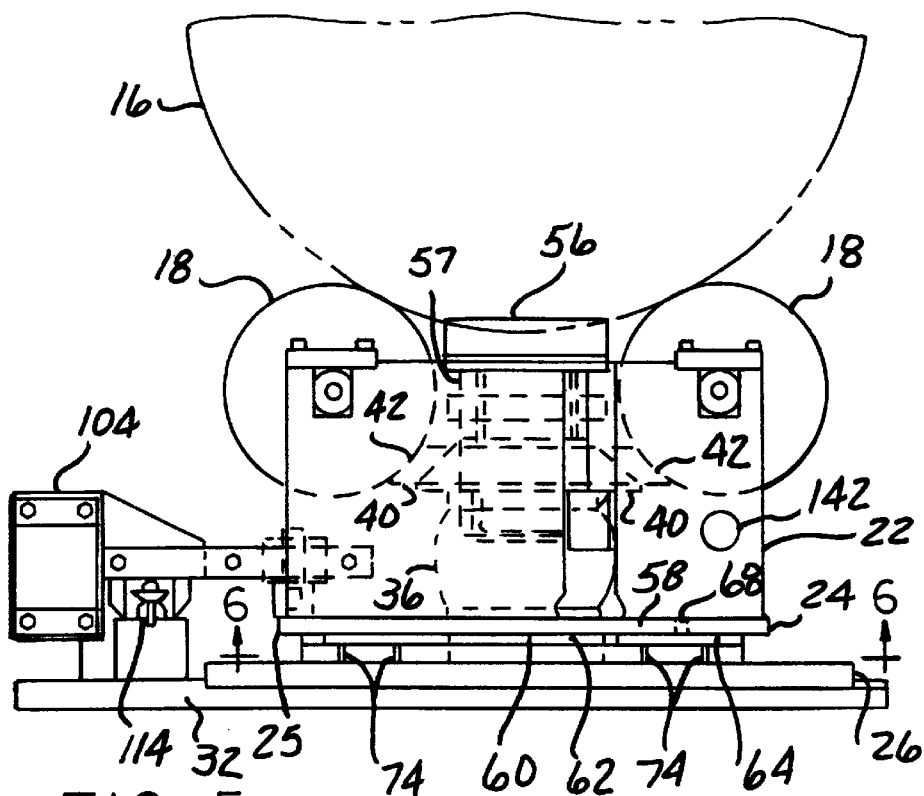
FIG. 5 is a side view showing a wheel alignment apparatus with an inflatable stop in its operational mode, an air bearing beneath a float plate, and an alternative embodiment of a stop for the float plate.

The rollers 18 have their axes 20 rollably supported on an extending frame 22 which is connected to and extended upwardly from a base or plate 24. The base or plate 24 is free to move along or above a floor or horizontal surface 26. Therefore, the base or float plate 24 may be rollably supported by three or more roller bearings 27 (shown in FIG. 3) or; as preferred and discussed further, the float plate 24 may be supported over the horizontal surface by an air gasket or air bearing 28. The air bearing 28 is shown more clearly in FIG. 7. The movement of the float plate 24 can be restricted by an extending arm 30 (FIG. 1) which is anchored and secured to a support structure or foundation 32 (Other embodiments to regulate movement of the float plate are shown in FIGS. 4 and 5 and will be discussed further). The extending arm 30 may include a slotted aperture 34 such that the plate may move or float within a predetermined area and distance determined by movement within the slotted aperture 34. As discussed further, the float plate 24 may also be connected to a pivoting connecting arm to allow for testing of a turning radius of the motor vehicle.

An inflatable stop is provided for the rollers 18. The inflatable stop includes an inflatable rubberized bag 36 mounted on a top surface of the float plate 24. The inflatable rubberized bag 36 is centered between the cylindrical rollers 18 as shown in FIG. 3. The inflatable bag 36 is in communication with means for supplying pressurized air to the bag as well as means for exhausting air from the inflatable bag 36. The means for providing pressurized air may include an inlet 38 (shown in FIGS. 1 and 3) extending from an inlet at the top of the inflatable bag 36 to provide pressurized air to the bag from an external pressurized air source (not shown).

The bag 36 exhausts pressurized air through the same inlet wherein the pressurized air source provides an exhaust to atmosphere.

A pair of brake pads 40 are connected to the inflatable bag 36. The brake pads or shoes 40 are fabricated from aluminum bars with beveled ends. Each brake pad 40 has a high friction braking material 42 bonded to each beveled end. The brake pads 40 are mounted between the cylindrical rollers 18 such that when the bag 36 is deflated the brake pads 40 lower so that the braking material 42 disengages the cylindrical rollers 18. When the bag 36 inflates, the brake pads 40 engage the cylindrical rollers 18 and prevent the rollers 18 from rotating. Over time, the brake pads 40 wear to conform to the surface of the cylindrical rollers 18. FIG. 5 shows the inflatable bag 36 in its inflated position with the brake pads 40 engaged with the cylindrical rollers 18. FIG. 1 shows the inflatable bag 36 in its deflated position with the brake pads 40 disengaged from the cylindrical rollers. In phantom, FIG. 1 also shows inflatable bag 36 inflated and the brake pads 40 engaged with the rollers 18. The inflatable bag 36 provides a self compensating stop because the inflation height of the inflatable bag 36 is limited by the brake pads 40 contacting the roller 18 surface.

Looking now at FIGS. 3 and 4, to lock and prohibit the float plate 24 from moving, the apparatus 10 includes a rod 44 which extends across the float plate 24, parallel to the longitudinal axis 20 of the cylindrical rollers 18, and between and below the cylindrical rollers 18. The ends of the rod 44 have a cylindrical cap 46 which engage a V-shaped slot or cam 48 surface which is connected to a pair of brackets 50. The brackets 50 are mounted to the support structure or foundation 32. When the bag 36 is deflated, the ends of the rod are lowered into the wide shaped portion 52 of the V-shaped slot 48 of the brackets 50, to allow the float plate 24 to move freely. When the inflatable bag 36 inflates, the rod 44 is raised by the inflation of the bag 36 such that the ends of the rod 44 engage the narrow portion 54 of the slot 48, thereby locking or prohibiting movement of the float plate 24 with respect to the support structure 32.

In order to lift and assist in the removal of the motor vehicle from the wheel alignment apparatus 10, the inflatable bag 36 has a hardened plate or hardened material surface 56 connected to or on the top side of the bag 36. The hardened plate 56 may be spaced from the inflatable bag 36 by an elevating extension 57 which is attached to the inflatable bag 36. The hardened material surface 56 extends between the cylindrical rollers 18 so that it engages the tires 16 of the motor vehicle when the inflatable bag 36 is in the inflated position. When the bag 36 is deflated, the hardened material surface 56 is lowered beneath the tires 16 of the motor vehicle so that the tires 14 of the motor vehicle do not engage the hardened material surface 56 on the bag 36. Other means may be used to raise the hardened plate 56, including an air cylinder, a mechanical hoist or other elevating apparatuses.

In operation, the inflatable bag 36 begins in the inflated position so that the brake pads 40 engage and lock the cylindrical rolls 18, the rod 44 engages the narrow portion 54 of the slot in bracket 50 to prohibit movement of the float plate 24, and the hardened material surface 56 extends upwardly to support the tires 16 of the motor vehicle. The motor vehicle is driven onto the ramps 12, wherein the vehicle is placed on the cylindrical rolls 18 of the wheel alignment apparatus 10. The inflatable bag 36 may then be deflated such that the hardened material surface 56 is lowered, the brake shoes 40 release the cylindrical cylinders 18, and the rod 44 disengages the narrow portion 54 of slot 48 in brackets 50 to release the float plate 24. The vehicle may now be tested. When the wheel alignment procedure is completed, the inflatable bag 36 is again inflated so that the float plate 24 is prohibited from moving, and the cylindrical rollers 18 are prevented from rotating. The hardened material surface 56 of the bag 36 engages the tires 16 of the motor vehicle and lifts the motor vehicle to ease the driving of the motor vehicle off the cylindrical rollers 18 and reduce the amount of braking force required on the cylindrical rollers 18.

As discussed supra, the float plate 24 may be supported by three or more ball bearings 27 housed in the floor of the float plate 24 as shown in FIGS. 3 and 4. The ball bearings 27 can extend outwardly from the bottom surface of the float plate 24 so as to roll along a high strength material and substantially horizontal surface 29 defining a wear plate of the wheel alignment apparatus. Thus, the ball bearings 27 allow the float plate 24 to float or move while the wheels/tires 16 of the motor vehicle are rotating. The movement of the float plate 24 allows the vehicle to move in the X-Y (horizontal) plane thus allowing the motor vehicle to settle into its natural position.

Figure 6:
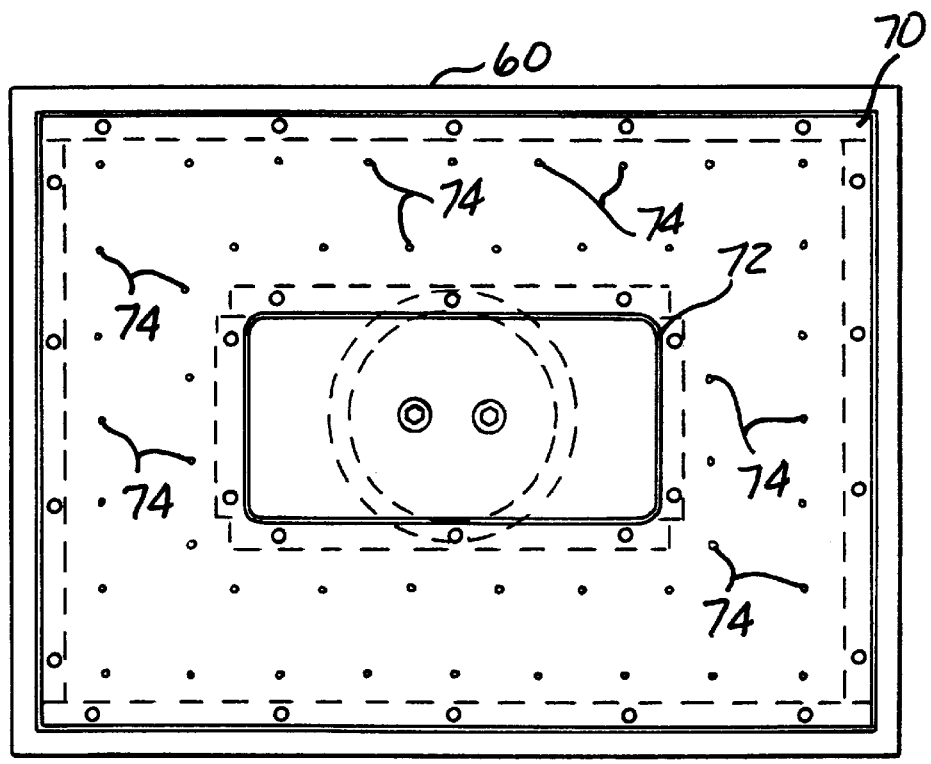
FIG. 6 is a view taken along lines 6—6 of FIG. 5.

In the preferred embodiment, the ball bearings 27 and wear plate 29 are replaced by an air bearing 28 between the float plate 24 and the fixed horizontal surface 26. The float plate 24 floats or moves on the air bearing 28. Looking at FIGS. 5 and 7, the float plate 24 includes a top portion 58, a bottom portion 60, and a hollow void area 62 therebetween forming a manifold which is enclosed by a wall 64 around the outer perimeter and wall 64 forming a center cut-out. The top portion 58 of the float plate 24 is provided with one or more apertures 68 for introducing pressurized air into the manifold 62 of the float plate 24. The pressurized air is provided from an external pressurized air source (not shown). The bottom portion 60 of the float plate 24 is shown in FIG. 6, and includes a first gasket 70 around the outer perimeter of the bottom portion and a second gasket 72 around the perimeter of the inner cutout section. The first and second gaskets 70 and 72 provide a seal between the top portion 58 and the bottom portion 60 of the float plate 24 and to seal the manifold 62 therebetween. Between the two gaskets, a plurality of small air holes 74 extend through the bottom portion 60 of the float plate 24. The plurality of small air holes 74 are generally equally interspersed over the surface area of the bottom portion 60 of the float plate 24. When pressurized air is sent into the manifold 62 via the one or more apertures 68 in the top portion 58 of the float plate 24, the air circulates and fills the entire manifold and then is forced through the small air holes 74 in the bottom portion 60 of the float plate 24. The air exits the small air holes 74 and is forced against the fixed horizontal surface 26 and thereby forms the air bearing or cushion 28 between the fixed surface 26 and the bottom surface of the float plate 24. The dimension of the air bearing 76 will vary and depend upon the weight of the vehicle and the float plate 24. The float plate 24 will be allowed to hover or float over the fixed horizontal surface 26 while the wheels of the motor vehicle are rotating to allow the motor vehicle to settle into a natural position along the X-Y or horizontal plane. The use of an air bearing 28 is preferred to the ball bearings 27 and their required wear plates 29 in that the air bearing 28 does not require cleaning or lubrication.

The float plate 24 may be connected to the support structure by various means to greatly restrict the movement of the float plate 24 as it moves over the ball bearings 27 or air bearing 28, or to selectively allow the float plate a large degree of movement when in the unlocked position. FIG. 4 illustrates the float plate 24 attached to the support structure 32 by a non-movable rigid arm 30. When in the unlocked position, the float plate 24 may pivot only a few degrees about the rigid arm 30.

Figure 8B:
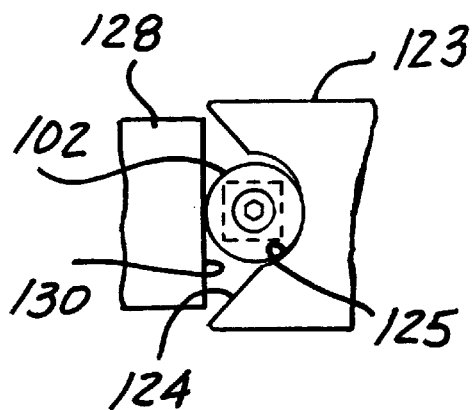
FIG. 8b is a partial view of the stop in FIG. 8a of a slave locator.
Figure 8C:
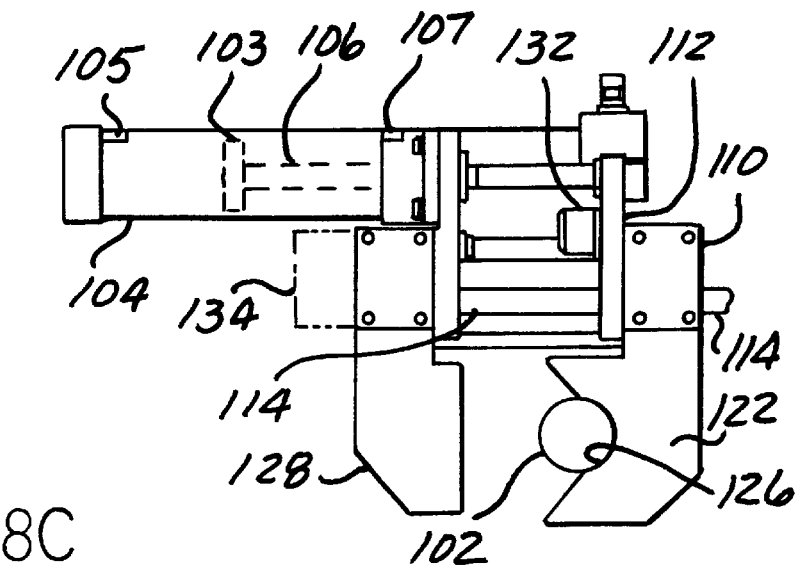
FIG. 8c is a partial view of the stop in FIG. 8a showing positions of the air cylinder and piston rod during partial converging of the wedge brackets.
Figure 8A:
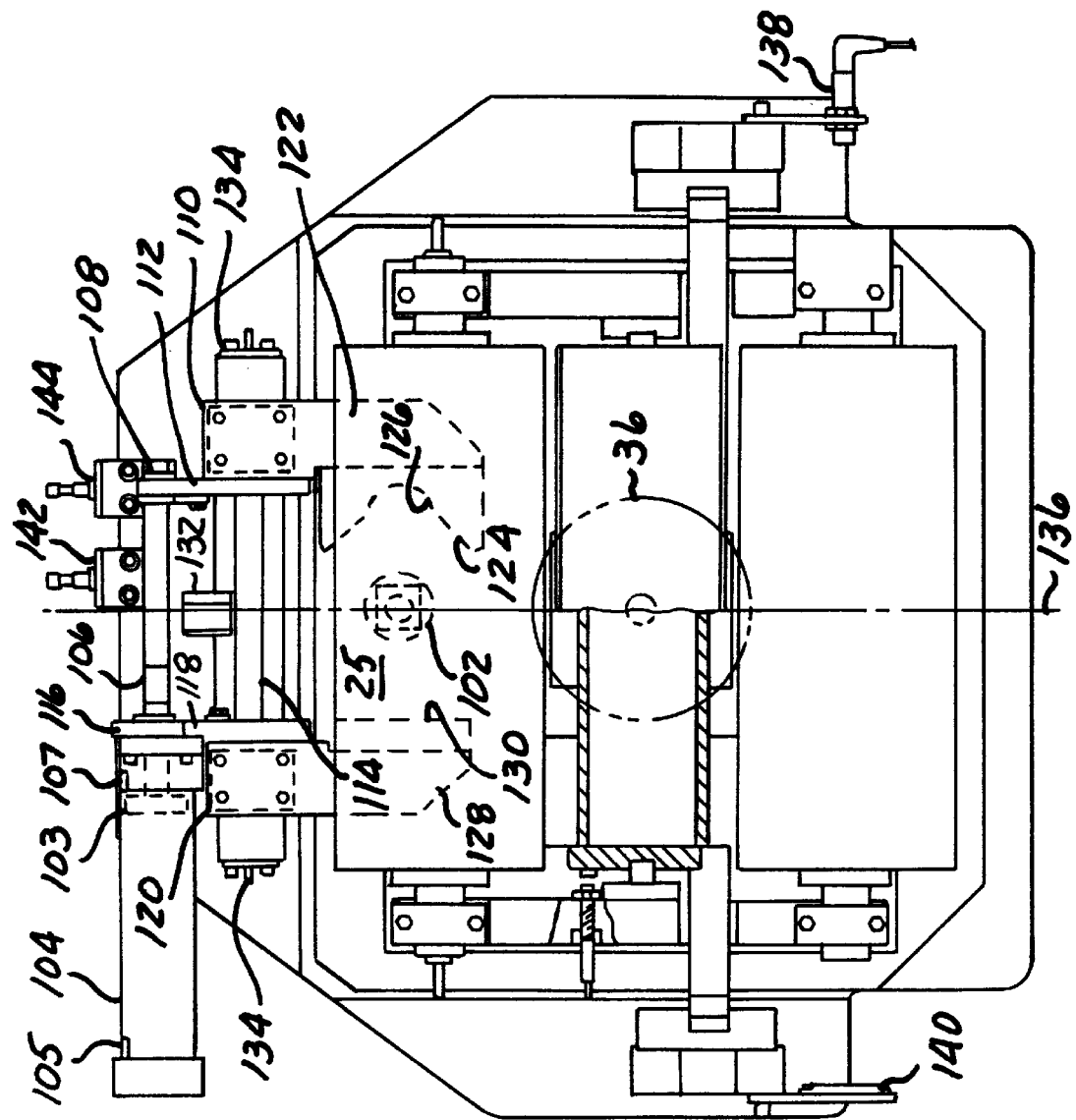
FIG. 8a is a top view of the stop for the float plate as shown in FIG. 5 showing an air cylinder, piston rod and wedge brackets.

FIG. 5 and FIG. 8a illustrate another embodiment of the movement limiting assembly for the float plate 24. Looking at FIG. 8a, the assembly includes a roller bearing 102 fixedly attached to a front and center portion 25 of the float plate 24. An air cylinder 104 having a piston 103 with attached reciprocating rod 106 and two air entry ports 105 and 107 is located in front of the float plate 24. The exterior rod end 108 of reciprocating rod 106 is attached to a first bearing block 110 via a connecting rod 112 traversely connected to the exterior rod end 108. The first bearing block 110 is also slidably connected on a rail or slide carriage 114 which is positioned adjacent and parallel to the reciprocating rod 106. The slide carriage 114 is fixedly connected to the support structure 32. The air cylinder 104 has a front end 116 at the mouth of the cylinder 104 which is connected to a second connecting rod 118 which in turn is connected to a second bearing block 120 that is also slidably connected to slide carriage 114. As a result, the first bearing block 110 moves with the reciprocal movement of the cylinder rod 106. The second bearing block 120 moves with the reciprocal movement of the air cylinder 104 on the slide carriage 114. The slide carriage 114 and the connected first and second bearing blocks 110 and 120 respectively are located in front of the float plate 24.

Also fixedly attached to the first bearing block 110 is a wedge bracket 122 having an inner surface 124 that tapers to a rounded central portion 126 corresponding to the shape of the roller bearing 102 which defines a master locator for the roller bearing 102. On a wheel alignment assembly there are typically one master locator for one of the tires and three slave locators having slotted central portions for the remaining three tires. (A slave locator is shown in FIG. 8b and will be discussed further). The second bearing block 120 is fixedly attached to a wedge bracket 128 having a linear inner surface 130. The wedge brackets 122 and 128 overhang the float plate 24. When the bearing blocks 110 and 120 converge toward each other on slide carriage 114, the wedge brackets 122 and 128 also converge to trap the roller bearing 102 therebetween. The tapered inner surface 124 of wedge bracket 122 acts to guide the roller bearing 102 to a centered location relative to the wheel alignment apparatus 10. Stops 132 are centrally located between the bearing blocks 110 and 120 to limit the movement of each bearing block 110 and 120 and wedge bracket 127 and 128 to the center location. End bumpers 134 are located at the outer boundaries of the wheel alignment apparatus to cushion the bearing blocks 110 and 120 when they diverge toward the outer boundaries of the wheel alignment apparatus 10.

FIG. 8a shows the wedge brackets 122 and 128 in their separated or diverged state. The roller bearing 102 is not confined by the wedge brackets 122 and 128 and therefore, the float plate 24 is free to pivot and move anywhere within the confines of the wheel alignment apparatus 10. Various positions of the roller bearing 102, float plate 24 and inflatable stop 36 are shown in phantom when the roller bearing 102 is not captured by the wedge brackets 122 and 128. The wedge bracket 122 having a rounded inner surface 126 corresponding to the shape of the roller bearing 102 would be positioned at only one wheel or tire 16 of the vehicle. FIG. 8b shows the slave locators for the other three tires including wedge brackets 123 and 128 when they have converged around roller bearing 102. Wedge bracket 123 has a slotted central portion 125 rather than a round central portion as in the master locator to allow freedom for run out of the tires 16. When the wedge brackets 122 or 123 and 128 converge around roller bearing 102, the roller bearing 102 is held in a relatively fixed or stationary position which also maintains the float plate 24 in a relatively fixed position so that it may pivot only a few degrees about centerline 136.

Figure 8D:
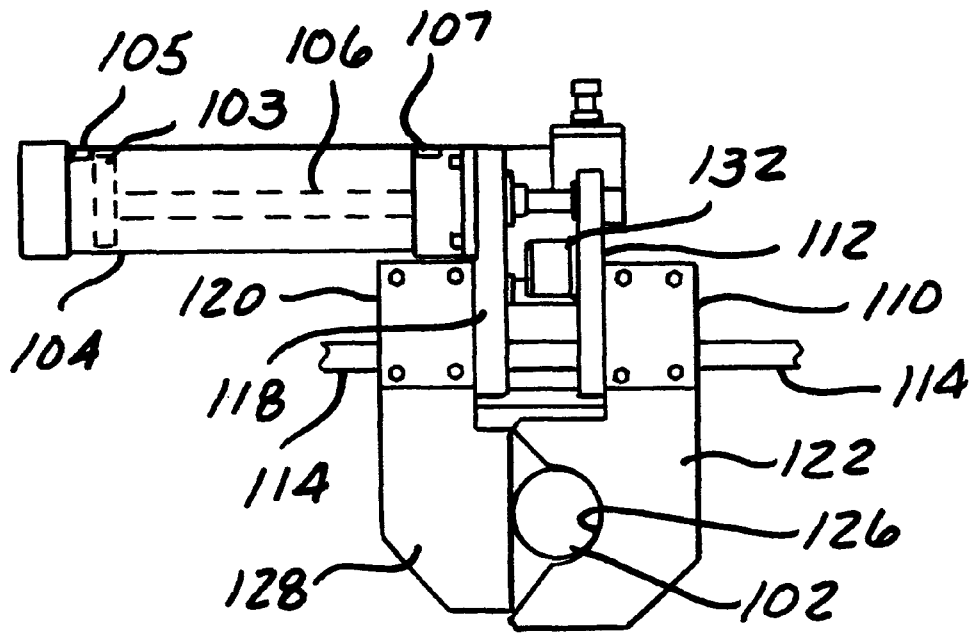
FIG. 8d is a partial view of the stop in FIG. 8a showing positions of the air cylinder and piston rod when the wedge brackets have converged.

When the wedge brackets 122 and 128 are positioned as shown in FIG. 8a, the piston 103 is located toward the center of the wheel alignment apparatus (toward stops 132) so that the reciprocating rod 106 is fully extended. To converge the wedge brackets 122 and 128 toward stops 132 and the center of the wheel alignment apparatus, air from an outside source is pumped into port 107 of the air cylinder 104. The piston 103 will move away from the center of the wheel alignment apparatus taking reciprocating rod 106 with it. Wedge bracket 122 will move with the movement of the reciprocating rod 106 until bearing block 110 contacts stop 132. When bearing block 110 contacts stop 132, piston 103 will be at half stroke within air cylinder 104. This is shown in FIG. 8c. As air continues to enter port 107, the inertia will then move bearing block 120 over slide carriage 114. Since bearing block 120 is attached to air cylinder 104 via rod 118 and also to wedge bracket 128, the air cylinder 104 and wedge bracket also move toward roller bearing 102 and stop 132, as shown in FIG. 8d.

Figure 8E:
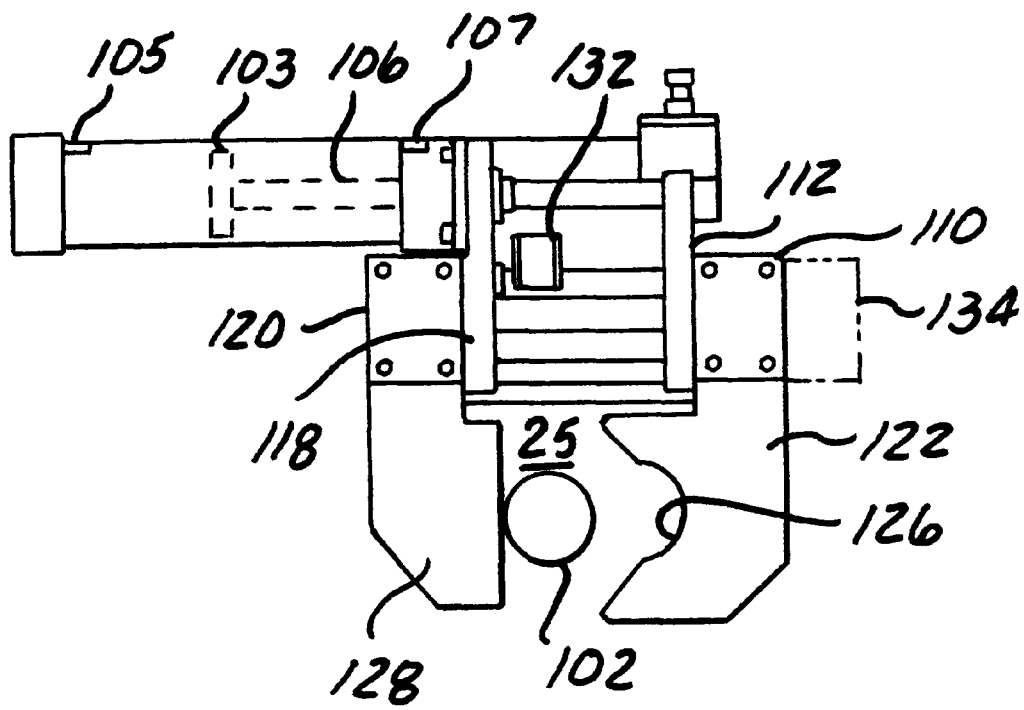
FIG. 8e is a partial view of the stop in FIG. 8a showing positions of the air cylinder and piston rod during partial separation of the wedge brackets.

To separate the wedge brackets 122 and 128, air is pumped into an inlet 105 of the air cylinder 104 from an outside source (not shown). The cylinder rod 106 is pushed through the mouth of the air cylinder 106 and away from the air cylinder taking along with it attached bearing block 110 and wedge bracket 122 away from roller bearing 102. When bearing block 110 hits bumper 134, the piston 103 is at half stroke within air cylinder 104 as shown in FIG. 8e. Continuous air through port 105 into air cylinder 104 will move the air cylinder 104 along with bearing block 120 and attached wedge bracket along slide carriage 114 in the direction away from the roller bearing 102 until bearing block 120 contacts bumper 134 as shown in FIG. 8a. The float plate 24 is free to move within the boundaries of the wheel alignment apparatus. The appropriate wheel alignment testing procedure may then be initiated.

When the testing procedure is completed, the wedge brackets 122 and 128 may be moved to converge around roller bearing 102 as discussed supra. A photo cell 138 may be used to send a beam through an alignment hole 142 against a reflector 140 to determine when the float plate 24 is centered. Proximity sensors 142 and 144 may be positioned to indicate when the wedge plate 122 is fully converged or diverged respectively.

Figure 9:
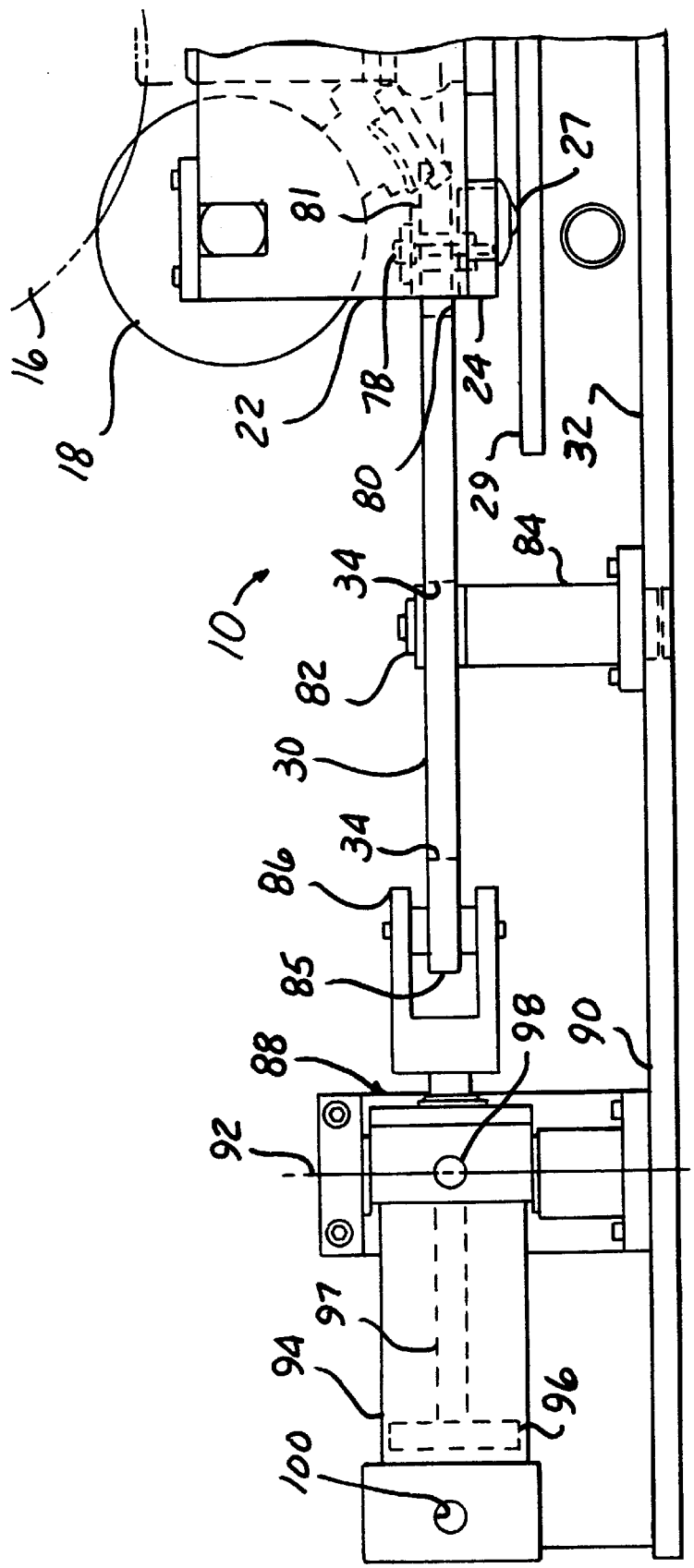
FIG. 9 is a side view of another embodiment of a selective stop having a movement limiting mechanism for the float plate for the wheel alignment apparatus.
Figure 10:
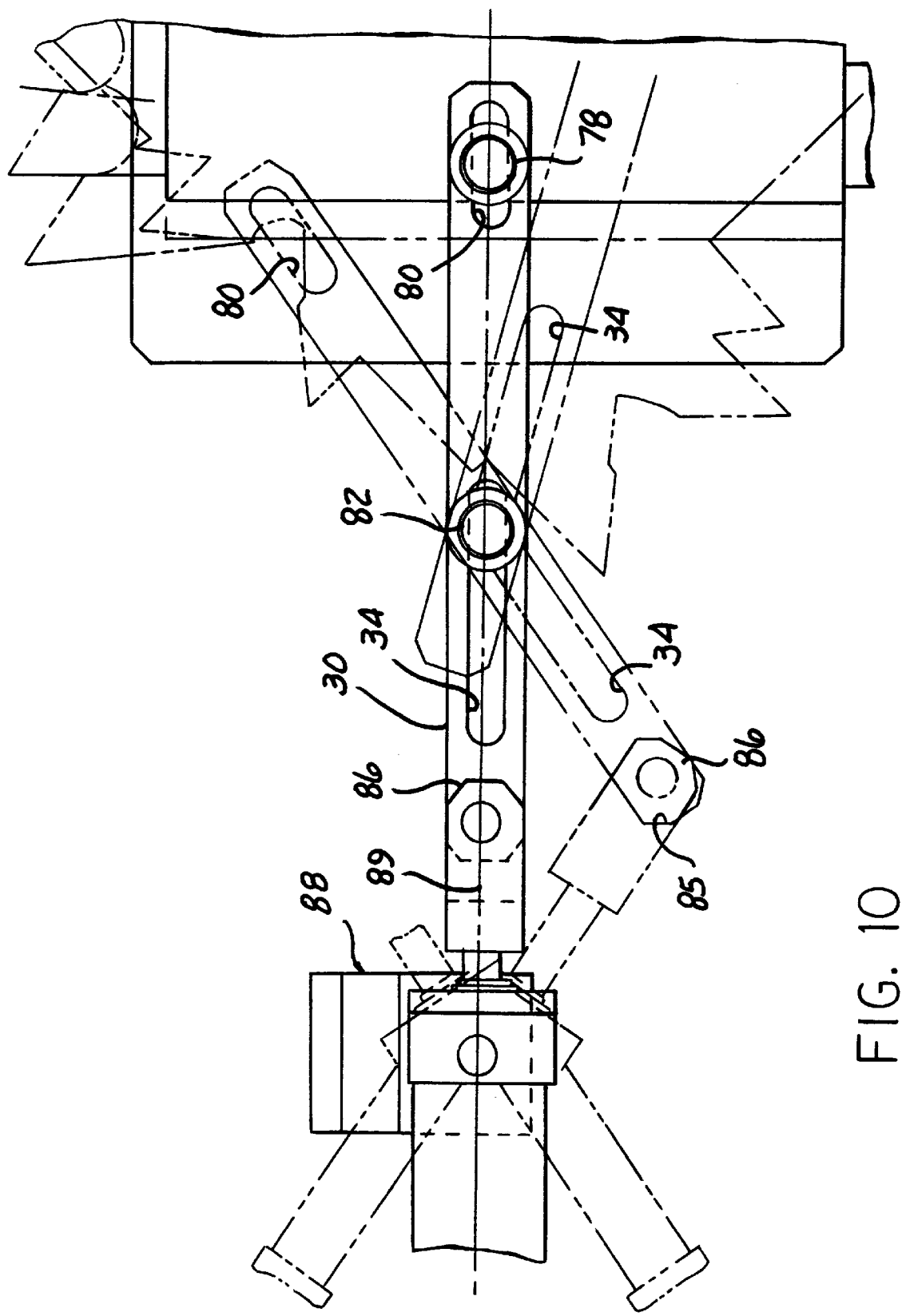
FIG. 10 is a top view of the movement limiting mechanism, showing various positions of the mechanism in phantom.

As shown in FIGS. 1, 9 and 10, another means to selectively restrict the movement of the float plate 24 during certain test procedures, the float plate 24 includes a pin 78 mounted in the front of the float plate 24. A connecting rod 30 provides a first slotted aperture 80 wherein the pin 78 extends through the first slotted aperture 80 provided at one end 81 of a connecting rod 30. The connecting rod 30 extends away from the float plate 24 wherein a second slotted aperture 34 is provided in the middle portion of the connecting rod 30. A second pivot pin 82 extends through the second slotted aperture 34 and is mounted to a rigid post 84 which is connected to a support structure or foundation 32.

An opposite end 85 of the connecting rod 30 is pivotally connected to a rod end 86 of a linear actuator 88. The linear actuator 88 is pivotally mounted to a support structure 90 to allow the linear actuator 88 to pivot about a vertical axis 92.

The linear actuator 88 includes a cylinder 94 and a piston 96 and piston rod 97 therein. The piston 96 and piston rod 97 are capable of reciprocal movement within cylinder 94 and are pneumatically controlled with an air port 98 and air vent 100. The linear actuator 88 provides the ability to move the rod end 86 toward and away from the float plate 24. For example, when a wheel alignment test is taking place, air from an outside source (not shown) enters the cylinder 94 through air port 98 and moves the piston 96 away from the vehicle so as to provide a substantially straight connection via the connecting rod 30 between the linear actuator 88 and the float plate 24 such that the connecting rod 30 extends along a longitudinal axis 89 of the ramp 12.

During operation of a wheel alignment test, the rod end 86 of the linear actuator 88 is retracted, and the connecting rod 30 is maintained along the longitudinal axis 89 of the runway 12 to maintain the float plate 24 in a position for wheel alignment testing. The wheel alignment testing limits the turn of the float plate 24 to approximately 5° in either direction from the longitudinal axis 89.

Once the wheel alignment testing is completed, air is vented to atmosphere through air vent 100 and the piston 96 and rod end 86 moves toward the vehicle. The turning radius of the motor vehicle may then be tested. The wheels of the motor vehicle are turned by an outside source (not shown), and the connecting rod 30 is allowed to pivot about the second pivot pin 82 and the linear actuator 88 pivots about the vertical axis 92. During the turning radius test of the motor vehicle, the float plate 24 may rotate approximately 40° in either direction. When the turning radius test is completed, the linear actuator retracts to bring the connecting rod back to its position so that the motor vehicle can be driven off the runway or ramps 12. When testing the turning radius on the motor vehicle, the wheels are generally tested in a static mode in which the wheels do not rotate. FIG. 9 is a top view of the limiting mechanism for the float plate 24. The positions of connecting rod 30, linear actuator 88, rod end 86 and second pivot pin 82 are shown in solid when the float plate's 24 movement is restricted. Various positions of the connecting rod 30, linear actuator 88, rod end 86, and second pivot pin 82 are shown in phantom during a wheel turning radius test.

Figure 7:
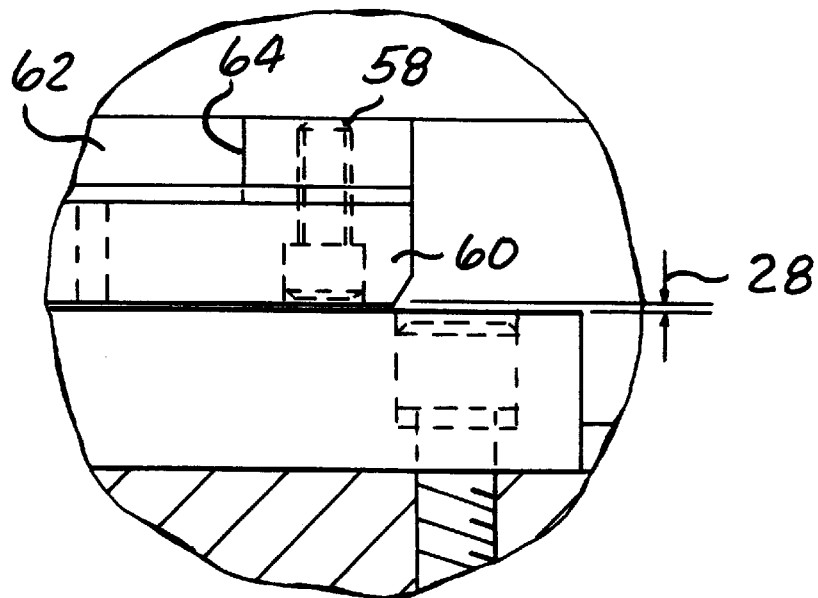
FIG. 7 is an enlarged view of the circled area of FIG. 5 showing details of the float plate of the preferred embodiment.

The feature of the limiting mechanism for the float plate may be used with a float plate 24 that is movable on ball bearings 27 as shown in FIGS. 6, 7 and 8 or may be used with a float plate 24 that is movable over an air bearing 28 as shown in FIGS. 1 and 5.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a wheel alignment apparatus having a fixed support structure and a pair of cylindrical rollers communicating with said support structure for supporting wheels of a motor vehicle and for rotating the wheels while maintaining the motor vehicle in an essentially stationary position, the improvement comprising:

supporting means for the rollers selectively movable over a fixed horizontal surface;

means for lifting the wheels away from the rollers; and
means for locking the cylindrical rollers and supporting means to prevent rotation of said rollers.

2. The improvement of claim 1, wherein said supporting means is floatable over a layer of air.

3. The improvement of claim 1, wherein said supporting means includes a float plate selectively movable relative to the fixed horizontal surface.

4. The improvement of claim 3, wherein said float plate includes a top portion, a bottom portion and a center void area therebetween defining a manifold.

5. The improvement of claim 4, wherein said top portion has at least one through aperture for introducing pressurized air into the manifold of the float plate.

6. The improvement of claim 5, wherein the bottom portion has a plurality of air passages therethrough.

7. The improvement of claim 6, wherein the float plate is connected to the rollers.

8. The improvement of claim 6, wherein the means for locking said supporting means includes a rod communicating with said float plate, a pair of brackets mounted to the support structure and a cam connected to said brackets, said cam having narrow and wide portions, said rod having ends engaging the cam, such that when said rod ends are in said narrow portion of the cam, the float plate has limited movement.

9. The improvement of claim 1, wherein said means for lifting the wheels away from the rollers includes an elevator mounted on said supporting means.

10. The improvement of claim 9, wherein said elevator includes an inflatable bag.

11. The improvement of claim 9, wherein said elevator has a top portion having a hardened material surface.

12. The improvement of claim 10, wherein said inflatable bag communicates with an upper portion having a hardened material surface.

13. The improvement of claim 12, wherein said hardened material surface extends between the cylindrical rollers when said inflatable bag is in the inflated position.

14. The improvement of claim 9, wherein said elevator is connected to a pair of brake pads.

15. The improvement of claim 14, wherein said brake pads engage the cylindrical rollers when the elevator is in an expanded position.

16. The improvement of claim 14, wherein said brake pads have beveled ends and a high friction braking material bonded to each beveled end.

17. The improvement of claim 1, further comprising means for selectively turning the front wheels of a vehicle a first predetermined angle from a longitudinal axis while the vehicle is motionless to test the turning radius of said front wheels.

18. The improvement of claim 17, further comprising means for selectively limiting the turning of the front wheels of the vehicle to a second predetermined angle from the longitudinal axis, wherein the second predetermined angle is less than the first predetermined angle.

19. The improvement of claim 18, wherein said means for turning the front wheels of first predetermined angle include a linear actuator linked to the support means for the rollers.

20. The improvement of claim 19, wherein the linear actuator is pivotally connected to a connecting rod, and said connecting rod is selectively pivotable to the supporting means.

21. The improvement of claim 1, further comprising means to selectively fix said supporting means to an essentially stationary position relative to said horizontal surface wherein said means to selectively fix said supporting means includes a roller bearing attached to said supporting means, said roller bearing centrally located on said supporting means, and wedge brackets movable to converge around said roller bearing to fix said supporting means to an essentially stationary position.

22. The improvement of claim 21, wherein said wedge brackets are connected to a slide carriage for reciprocal movement.

23. The improvement of claim 21, wherein stops are located along a longitudinal centerline to limit the movement of said wedge brackets.

24. The improvement of claim 22, further comprising an air cylinder having a cylinder rod reciprocally movable away from the air cylinder, wherein said cylinder rod is parallel to the slide carriage.

25. The improvement of claim 24, wherein one of the wedge brackets communicates with the air cylinder via an extension rod and the other wedge bracket communicates with the cylinder rod via another extension rod.

26. The improvement of claim 21, wherein one of the wedge brackets has a tapered inner surface facing the roller bearing.

27. The improvement of claim 26, wherein the center portion of the tapered inner surface essentially corresponds with the shape of the roller bearing for at least one wheel of the vehicle.

28. In a vehicle wheel alignment apparatus having a stationary base communicating with at least one pair of cylindrical rollers for supporting the wheels of a vehicle, the improvement comprising:

means for lifting the wheels away from the cylindrical rollers including an elevator communicating with a hardened surface, wherein said hardened surface extends between and above said rollers when said elevator is elevated.

29. The improvement of claim 28 wherein said elevator is an inflatable bag.

30. In a vehicle wheel alignment apparatus having a stationary base communicating with at least one pair of cylindrical rollers for supporting the wheels of a vehicle, the improvement comprising:

a selectively movable support means for the cylindrical rollers including a float plate connected to said stationary base;

means for locking said float plate in an essentially stationary position; and means for selectively limiting movement of said float plate including a linear actuator communicating with said float plate.

31. The improvement of claim 30 wherein said means for selectively limiting movement of said float plate includes a roller bearing attached to said float plate and wedge brackets activated by the linear actuator to move said roller bearing to a center location.

32. The improvement of claim 30 wherein said linear actuator communicates to the float plate via a connecting rod.

33. The improvement of claim 32 wherein said linear actuator communicates with said connecting rod at a pin and said linear actuator selectively pivots about said pin.

34. In a wheel alignment apparatus having a fixed support structure and a pair of cylindrical rollers communicating with said fixed support structure for supporting wheels of a motor vehicle and for rotating the wheels, the improvement comprising:

a selectively movable support means for the cylinder rollers including a float plate communicating with said fixed support structure, wherein said float plate is movable over a layer of air; and means for repositioning the float plate to handle various track widths and wheel bases of vehicles.

* * * * *